(No Model.)
W. L. VOELKER.
MATERIAL AND PROCESS FOR INCANDESCING MANTLES.
No. 568,184. Patented Sept. 22, 1896.
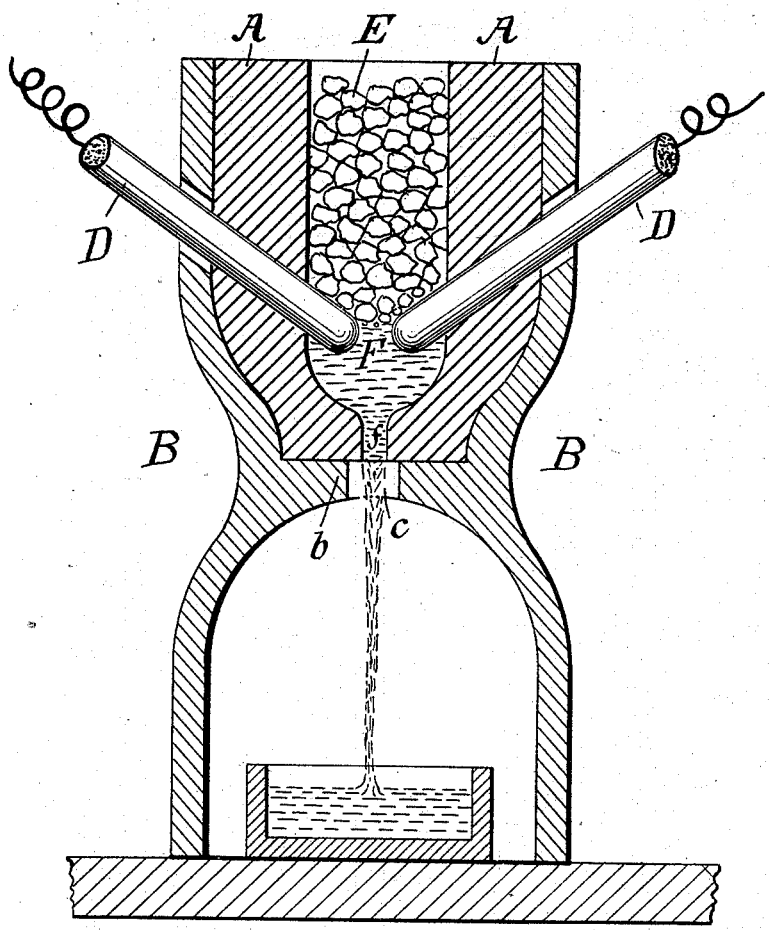

UNITED STATES PATENT OFFICE.

WILLIAM L. VOELKER, OF ELIZABETH, NEW JERSEY, ASSIGNOR TO THE CONSOLIDATED STERLING INCANDESCENT GAS LAMP COMPANY, OF NEW JERSEY.

MATERIAL AND PROCESS FOR INCANDESCING MANTLES.

SPECIFICATION forming part of Letters Patent No. 568,184, dated September 22, 1896.

Application filed May 19, 1896. Serial No. 592,113. (No specimens.)

*To all whom it may concern:*

Be it known that I, WILLIAM L. VOELKER, a citizen of the United States, and a resident of Elizabeth, Union county, State of New Jersey, have invented a new and useful Improvement in Materials for Incandescing Mantles and Processes for Manufacturing the Same, of which the following is a specification.

My invention relates to improvements in materials for incandescing mantles and processes for manufacturing the same.

In the first place, the invention consists in a new incandescing material, and the same consists of an intimate union or combination of two or more of the alkaline metals or metals of the earths proper in the proportions substantially as hereinafter specified. This union is produced by the action, upon an intimate mixture of the ingredients in such proportions, of intense heat, such as that in an electric furnace. Preferably this material is substantially such a union of calcium and magnesium as is hereinafter described, and it may contain a small percentage or trace of other substances to vary the tint of the light.

In the drawing which accompanies the specification I have shown a vertical section of an electric furnace for fusing the ingredients.

My material is prepared in the following manner: Suitable salts of the selected alkaline metals or metals of the earths proper which are soluble in water and are easily decomposed by heat, such as the nitrates, are thoroughly mixed together in a finely-powdered condition and in the proportions of their molecular weights, which proportions give the best results both as to light and durability. For example, for making my incandescing material one hundred and sixty-three and seven-tenths (163.7) parts by weight of calcium nitrate and one hundred and forty-eight and two-tenths (148.2) parts by weight of magnesium nitrate are taken. These are ground fine, mixed, and then dissolved together in distilled water. The solution should be made with the minimum quantity of water that will serve the purpose. When the nitrates have been dissolved, the solution is evaporated in a suitable vessel heated up to a temperature sufficient for the decomposition of the nitrates. The decomposition is completed at a red heat. The mass which results is an intimate mixture or union of the oxids of calcium and magnesium and which will produce a pure white light.

If it is desired to give a yellow tinge to the light, a small proportion or trace, say one-eighth of one per cent., of cerium nitrate is added to the powdered substances and dissolved and evaporated with them, as described, or if a ruddy tint is desired the same quantity of chromium nitrate is added and treated as before described. The result in all cases is an intimate union or admixture of the oxids of the several ingredients.

After evaporation the mass is transferred to a furnace composed of pure calcium oxid, and is therein fused by the electric arc or other means. Referring to the aforesaid drawing, A is the furnace of pure calcium oxid set in a frame B. D D are the terminals of pure carbon connected with electric-circuit wires in any usual manner, and between which carbons the arc is formed. Said terminals D D are inserted through suitable holes in the furnace A and frame B, and may be insulated in any suitable manner. The mass resulting from the previous steps of the process is broken into lumps E, which are fed into the furnace from the top. As the material fuses it runs into the lower part F of the furnace and out by the openings $f$ $c$ and into suitable vessels or molds. When it is not desired to mold the material, it is simply allowed to cool into a large lump or cake.

Now the operation of fusion forces the particles or molecules of the substances into a most intimate union and results in my new incandescing material. This lump or cake is next ground to an impalpable powder, and is then combined with suitable viscous materials to produce a tough mass in the following manner: A mixture is formed which consists of one part camphor and two parts guncotton by weight. These are dissolved in forty times their weight of oil of cassia. To the solution are added drop by drop four parts by weight of the strongest sulfuric acid, the solution being constantly stirred as the reaction takes place. The completion of the reaction is indicated when the whole has doubled its bulk. Then the solution is cooled to normal temperature. The cooled mass has a viscous constituency, and is used in the proportion of one part by weight to three parts by weight of the powdered magnesium calcite. This powder is then mixed into the viscous mass, and then thoroughly incorporated with it by passing the whole between hot rolls. This rolling not only thoroughly incorporates the chemicals with the viscous mass, but also consolidates and toughens the product. After being thoroughly rolled, this product is put in a metallic vessel or chamber, pressed with great pressure, and while being pressed is heated to a high temperature (say 110° Fahrenheit) for twenty-four hours, more or less. The final product is very tough and can be rolled into sheets or drawn into threads, as through dies. The sheets may be perforated and formed into mantles, or the threads can be knitted to form them. The viscous material carbonizes when the mantle is burned out, and there is left a mantle consisting of the oxids of the chemicals that were used.

Now, having described my improvements, I claim as my invention—

1. A material for use in making incandescing mantles, consisting of the oxids of magnesium and calcium, first combined in the proportions substantially as hereinbefore specified and then fused at high temperatures; substantially as described.

2. A material for use in the manufacture of incandescing mantles consisting of the oxids of magnesium and calcium intimately mixed together in the proportions, substantially as hereinbefore specified, and of traces of color-producing mineral oxids, and all fused together at high temperatures, substantially as described.

3. The process of manufacturing materials for producing incandescence, consisting in mixing together the oxids of magnesium and calcium substantially in the proportions hereinbefore specified, and then heating the combined materials to a very high temperature, substantially as and for the purpose specified.

4. A material for the manufacture of incandescents consisting of the oxids of magnesium and calcium combined and fused in the proportions substantially as hereinbefore specified, and of a viscous carbonizable joining material, substantially as described.

In testimony that I claim the foregoing as my invention I have signed my name, in presence of two witnesses, this 8th day of May, 1896.

WILLIAM L. VOELKER.

Witnesses:
BERNARD J. ISECKE,
HENRY V. BROWN.